US011023933B2

(12) United States Patent
Goodhart et al.

(10) Patent No.: US 11,023,933 B2
(45) Date of Patent: Jun. 1, 2021

(54) SYSTEM AND METHODS FOR DISCOVERING ADVERTISING TRAFFIC FLOW AND IMPINGING ENTITIES

(71) Applicant: Oracle America, Inc., Redwood Shores, CA (US)

(72) Inventors: Jonah Goodhart, Ithaca, NY (US); Noah Goodhart, Ithaca, NY (US); Robert Crowell, New York, NY (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 13/931,299

(22) Filed: Jun. 28, 2013

(65) Prior Publication Data
US 2017/0316466 A1 Nov. 2, 2017

Related U.S. Application Data

(60) Provisional application No. 61/666,818, filed on Jun. 30, 2012.

(51) Int. Cl.
*G06Q 30/02* (2012.01)
(52) U.S. Cl.
CPC .................. *G06Q 30/0277* (2013.01)
(58) Field of Classification Search
USPC .......... 705/7.2–7.37, 14.1–14.78, 27.1–27.7; 709/127–275; 715/223–317
See application file for complete search history.

(56) References Cited

U.S. PATENT DOCUMENTS

| | | | |
|---|---|---|---|
| 6,108,637 | A | 8/2000 | Blumenau |
| 6,115,680 | A | 9/2000 | Cofee |
| 6,151,608 | A | 11/2000 | Abrams |
| 6,230,204 | B1 | 5/2001 | Fleming, III |
| 6,327,619 | B1 | 12/2001 | Blumenau |
| 6,418,470 | B2 | 7/2002 | Blumenau |
| 6,778,982 | B1 | 8/2004 | Knight et al. |

(Continued)

FOREIGN PATENT DOCUMENTS

CN 102253820 11/2011

OTHER PUBLICATIONS

Shuai Yuan, Ahmad Zainal Abidin, Marc Sloan, Jun Wang, Internet Advertising: An Interplay among Advertisers, Online Publishers, Ad Exchanges and Web Users, Jul. 2, 2012. (Year: 2012).*

(Continued)

*Primary Examiner* — E Carvalho
(74) *Attorney, Agent, or Firm* — Kilpatrick Townsend & Stockton LLP (57) ABSTRACT

The present technology is directed to a system and methods for estimating the impinging elements and traffic paths by an advertisement as it is delivered from its originating ad server to the web server from which the webpage including the advertisement is delivered to an end viewer. The methods are server-based and provide output to a viewer's browser upon receiving a web page as input and yield data for a particular advertisement frame about the various intermediate processes used to deliver the advertisement, for example, frames, pixels, advertisement servers, advertisement networks, advertisement tags, advertisement exchanges, cookies, supply side distribution systems, demand side buying systems, etc.

4 Claims, 7 Drawing Sheets

(56) References Cited

U.S. PATENT DOCUMENTS

| | | | |
|---|---|---|---|
| 7,263,497 B1 | 8/2007 | Wiser et al. | |
| 7,310,609 B2 | 12/2007 | Middleton, III et al. | |
| 7,386,473 B2 | 6/2008 | Blumenau | |
| 7,613,635 B2 | 11/2009 | Blumenau | |
| 7,620,624 B2 | 11/2009 | Stata et al. | |
| 7,660,737 B1 | 2/2010 | Lim | |
| 7,716,326 B2 | 5/2010 | Blumenau | |
| 7,756,974 B2 | 7/2010 | Blumenau | |
| 7,917,755 B1 | 3/2011 | Giliyaru | |
| 8,108,245 B1 | 1/2012 | Hosea | |
| 8,190,604 B2 | 5/2012 | Wen et al. | |
| 8,255,491 B1* | 8/2012 | Arzur | 709/219 |
| 8,266,115 B1 | 9/2012 | Park | |
| 8,386,314 B2 | 2/2013 | Kirkby et al. | |
| 8,508,532 B1 | 8/2013 | Logan | |
| 8,544,050 B2 | 9/2013 | Brown et al. | |
| 8,554,938 B2 | 10/2013 | Mittal | |
| 8,666,989 B1 | 3/2014 | Gilliam et al. | |
| 8,799,103 B1 | 8/2014 | Federighi | |
| 8,880,996 B1 | 11/2014 | Deshpande | |
| 9,282,048 B1 | 3/2016 | Fichter et al. | |
| 10,600,089 B2 | 3/2020 | Fichter et al. | |
| 10,715,864 B2 | 7/2020 | Fichter et al. | |
| 2002/0098891 A1 | 7/2002 | Graham | |
| 2002/0103698 A1 | 8/2002 | Cantrell | |
| 2002/0111865 A1 | 8/2002 | Middleton, III | |
| 2002/0138331 A1 | 9/2002 | Hosea et al. | |
| 2002/0165773 A1 | 11/2002 | Natsuno et al. | |
| 2003/0122966 A1 | 7/2003 | Markman et al. | |
| 2003/0200145 A1 | 10/2003 | Krassner et al. | |
| 2005/0210533 A1 | 9/2005 | Copeland et al. | |
| 2005/0235030 A1* | 10/2005 | Lauckhart et al. | 709/200 |
| 2006/0026063 A1 | 2/2006 | Collins | |
| 2006/0080681 A1 | 4/2006 | Anwar et al. | |
| 2007/0039018 A1 | 2/2007 | Saslow et al. | |
| 2007/0050251 A1 | 3/2007 | Jain et al. | |
| 2007/0067267 A1 | 3/2007 | Ives | |
| 2007/0255702 A1 | 11/2007 | Orme | |
| 2007/0266305 A1 | 11/2007 | Cong et al. | |
| 2008/0004958 A1 | 1/2008 | Ralph et al. | |
| 2008/0114709 A1 | 5/2008 | Dixon et al. | |
| 2008/0120165 A1 | 5/2008 | Yan | |
| 2008/0320125 A1 | 12/2008 | O'Sullivan et al. | |
| 2009/0003704 A1 | 1/2009 | Hwang et al. | |
| 2009/0076899 A1 | 3/2009 | Gbodimowo | |
| 2009/0150500 A1 | 6/2009 | Kumar et al. | |
| 2009/0157813 A1 | 6/2009 | Jung et al. | |
| 2009/0187546 A1 | 7/2009 | Hamilton Whyte | |
| 2009/0216621 A1 | 8/2009 | Anderson et al. | |
| 2009/0228433 A1 | 9/2009 | Aguilar Saborit et al. | |
| 2009/0265243 A1 | 10/2009 | Karassner et al. | |
| 2009/0271260 A1 | 10/2009 | Sharma et al. | |
| 2009/0300528 A1 | 12/2009 | Stambaugh | |
| 2010/0023868 A1 | 1/2010 | Bonforte et al. | |
| 2010/0095317 A1 | 4/2010 | Toebes et al. | |
| 2010/0121676 A1 | 5/2010 | Jackson | |
| 2010/0146380 A1 | 6/2010 | Rousso et al. | |
| 2010/0153996 A1 | 6/2010 | Migos et al. | |
| 2010/0169792 A1 | 7/2010 | Ascar et al. | |
| 2010/0198697 A1 | 8/2010 | Brown et al. | |
| 2010/0241597 A1 | 9/2010 | Chen et al. | |
| 2010/0251128 A1 | 9/2010 | Cordasco | |
| 2010/0287054 A1 | 11/2010 | Zohar et al. | |
| 2010/0293031 A1 | 11/2010 | Jacobs et al. | |
| 2010/0295774 A1 | 11/2010 | Hennessey | |
| 2010/0310175 A1 | 12/2010 | Holt | |
| 2011/0029393 A1 | 2/2011 | Apprendi et al. | |
| 2011/0069940 A1 | 3/2011 | Shimy et al. | |
| 2011/0072131 A1 | 3/2011 | Zohar et al. | |
| 2011/0087966 A1 | 4/2011 | Leviathan | |
| 2011/0125587 A1 | 5/2011 | Netzer et al. | |
| 2011/0137737 A1* | 6/2011 | Baird et al. | 705/14.73 |
| 2011/0163971 A1 | 7/2011 | Wagner et al. | |
| 2011/0239243 A1 | 9/2011 | Dierks et al. | |
| 2011/0246267 A1 | 10/2011 | Williams et al. | |
| 2011/0246879 A1 | 10/2011 | White et al. | |
| 2011/0307659 A1 | 12/2011 | Hans et al. | |
| 2011/0320286 A1 | 12/2011 | Zohar et al. | |
| 2012/0078707 A1 | 3/2012 | Ramakrishnan et al. | |
| 2012/0106793 A1 | 5/2012 | Gershenson et al. | |
| 2012/0239489 A1 | 9/2012 | Peretti et al. | |
| 2012/0284738 A1 | 11/2012 | Narasimhan et al. | |
| 2012/0317472 A1 | 12/2012 | Chernysh | |
| 2012/0324098 A1 | 12/2012 | De Jager et al. | |
| 2013/0031470 A1 | 1/2013 | Daly, Jr. et al. | |
| 2013/0124342 A1 | 5/2013 | Virkar et al. | |
| 2013/0145384 A1 | 6/2013 | Krum et al. | |
| 2013/0173765 A1 | 7/2013 | Korbecki | |
| 2013/0179767 A1* | 7/2013 | Bajric et al. | 715/234 |
| 2013/0205314 A1 | 8/2013 | Ramaswamy et al. | |
| 2013/0238423 A1 | 9/2013 | Pottjegort | |
| 2013/0318051 A1 | 11/2013 | Kumar et al. | |
| 2013/0335576 A1 | 12/2013 | Gotschlich | |
| 2014/0040786 A1 | 2/2014 | Swanson et al. | |
| 2014/0108562 A1 | 4/2014 | Panzer | |
| 2014/0181634 A1 | 6/2014 | Compain | |
| 2014/0278993 A1 | 9/2014 | Massoudi et al. | |
| 2014/0282642 A1 | 9/2014 | Needham et al. | |
| 2015/0066940 A1 | 3/2015 | Fernandes et al. | |

OTHER PUBLICATIONS

WELOVEAD, WebDesignServed available on May 19, 2010, retrieved from <http://www.webdesignserved.com/gallery/WELOVEAD-beta/517326>, on Aug. 5, 2015.

WELOVEAD.com WELOVEAD, availlable on Mar. 7, 2011 <http://web.archive.org/web/20110307041600/http://www.welovead.com/en/works/database>.

Minimizing CPU Usage, Adobe Flash Platform, Available online at: https://web.archive.org/web/20111018064811/http://help.adobe.com/en_US/as3/mobile/WS4bebcd66a74275c36cfb8137 24318eebc6-8000.html, Oct. 18, 2010, 9 pages.

Timing it Right, Tinic Uro, Availabe online at: http://www.kaourantin.net/2010/03/timing-it-right.html, Mar. 1, 2010, 3 pages.

U.S. Appl. No. 13/945,851, Final Office Action, dated Feb. 23, 2018, 13 pages.

U.S. Appl. No. 13/945,851, Final Office Action, dated Apr. 25, 2019, 16 pages.

U.S. Appl. No. 13/945,851, Final Office Action, dated Jan. 15, 2016, 23 pages.

U.S. Appl. No. 13/945,851, Non-Final Office Action, dated Apr. 9, 2015, 12 pages.

U.S. Appl. No. 13/945,851, Non-Final Office Action, dated Sep. 21, 2018, 13 pages.

U.S. Appl. No. 13/945,851, Non-Final Office Action, dated Jun. 30, 2017, 19 pages.

U.S. Appl. No. 13/957,215, Final Office Action, dated Dec. 28, 2017, 16 pages.

U.S. Appl. No. 13/957,215, Final Office Action, dated May 19, 2016, 17 pages.

U.S. Appl. No. 13/957,215, Final Office Action, dated Feb. 5, 2019, 22 pages.

U.S. Appl. No. 13/957,215, Non-Final Office Action, dated Mar. 20, 2017, 16 pages.

U.S. Appl. No. 13/957,215, Non-Final Office Action, dated Aug. 28, 2018, 18 pages.

U.S. Appl. No. 13/957,215, Non-Final Office Action, dated Aug. 6, 2015, 18 pages.

U.S. Appl. No. 14/032,019, Final Office Action, dated Jun. 29, 2018, 13 pages.

U.S. Appl. No. 14/032,019, Final Office Action, dated May 9, 2016, 20 pages.

U.S. Appl. No. 14/032,019, Non-Final Office Action, dated May 2, 2019, 13 pages.

U.S. Appl. No. 14/032,019, Non-Final Office Action, dated Oct. 7, 2015, 14 pages.

U.S. Appl. No. 14/032,019, Non-Final Office Action, dated Aug. 16, 2017, 15 pages.

(56) References Cited

OTHER PUBLICATIONS

U.S. Appl. No. 14/213,360, Advisory Action, dated May 26, 2017, 4 pages.
U.S. Appl. No. 14/213,360, Final Office Action, dated Mar. 15, 2017, 18 pages.
U.S. Appl. No. 14/213,360, Final Office Action, dated Aug. 28, 2018, 21 pages.
U.S. Appl. No. 14/213,360, Non-Final Office Action, dated Jul. 13, 2016, 14 pages.
U.S. Appl. No. 14/213,360, Non-Final Office Action, dated May 20, 2019, 20 pages.
U.S. Appl. No. 14/213,360, Non-Final Office Action, dated Feb. 5, 2018, 25 pages.
U.S. Appl. No. 14/213,360, Notice of Allowance, dated Nov. 21, 2019, 7 pages.
U.S. Appl. No. 14/213,443, Final Office Action, dated Dec. 1, 2015, 15 pages.
U.S. Appl. No. 14/213,443, Final Office Action, dated Jun. 20, 2017, 23 pages.
U.S. Appl. No. 14/213,443, Final Office Action, dated Mar. 22, 2019, 33 pages.
U.S. Appl. No. 14/213,443, Non-Final Office Action, dated Feb. 23, 2015, 18 pages.
U.S. Appl. No. 14/213,443, Non-Final Office Action, dated Sep. 10, 2018, 20 pages.
U.S. Appl. No. 14/213,443, Non-Final Office Action, dated Nov. 30, 2016, 21 pages.
U.S. Appl. No. 14/213,443, Notice of Allowance, dated Mar. 10, 2020, 9 pages.

* cited by examiner

SYSTEM AND METHODS FOR DISCOVERING ADVERTISING TRAFFIC FLOW AND IMPINGING ENTITIES

CROSS REFERENCE TO RELATED APPLICATIONS

The present application claims the benefit of priority under 35 U.S.C. § 119(e) of U.S. Provisional Application No. 61/666,818 entitled "Method for Extracting Advertising Traffic Paths from Web Pages," filed on Jun. 30, 2012, by Jonah Goodhart, Noah Goodhart, and Robert Collier Crowell. The entire contents of the provisional application are incorporated by reference herein.

BACKGROUND

The present invention relates to systems and methods for estimating or discovering the network data flow by which a creative or advertisement ("ad") travels from the ad server where it originates to the web server from which the webpage including the creative ("ad") is delivered to an end user or client. The systems and methods relate to discovering, deriving, extracting, or otherwise, finding information that is useful for discovering advertising traffic flow and the impinging entities that impact the advertising as it flows.

The Internet and other types of on-line communication have become increasingly popular to the point where they now compete with traditional media such as print media and broadcast media for the attention of users. Because users are spending more and more time viewing content, playing games, and communicating with others on social networks, advertisers are spending more and more of their resources allocated for advertising on Internet advertising or online advertising. It is now ubiquitous for advertisers to use online advertising as a major venue of any advertising campaign that they may undertake.

Online advertising typically refers to any type of promotion that uses the Internet or the "World Wide Web" ("www") to deliver marketing messages and attract the attention of customers in search of products or services of interest to them. Examples of online advertising include contextual ads on search engine result pages, banner ads, rich media ads, social networking ads, interstitial advertising, etc. Online advertising is typically provided from or by an advertisement ("ad") server to a publisher, which includes the ads with published or served content. These new forms of online advertising are advantageous because they provide better targeting and placement as compared to traditional media.

Therefore, given the rise in online advertising, there is great demand by the online advertising industry to understand which companies are involved in the movement of an advertisement or "ad" from its origination point (e.g., the advertiser's server or "ad server") and the destination point (a publisher's web page). The online advertising industry makes considerable efforts to seek information or analytics about the choices made by those controlling an ad's flow or path towards its final destination, in other words, the traffic flow of advertisements or ads. This information or analytics criteria may relate to consumer privacy, publishing systems, ad networks, ad-optimization systems, ad exchanges, ad-verification and accountability systems, measurement systems, tracking systems, and other participants involved in the trafficking or display of an "ad." Even the buyers and sellers of an "ad" are often unable to determine these factors or criteria, and it is much more complex for those who are neither buyers nor sellers to either discover or locate this information with ease.

SUMMARY

The present invention relates to a system and methods for estimating the network data flow by which a creative or advertisement (ad) travels from its originating ad server to the web server from which the webpage including the creative or advertisement (ad) is delivered to an end user or client. The advertisement may be from at least one from a group of a private database, an ad server, another application that collects and stores advertisements in a database, and a client device. The systems and methods relate to discovering, deriving, extracting, or otherwise, locating information that is useful for determining advertising traffic flow and the impinging entities that impact advertisements as they flow.

The present technology is directed to a system and methods for estimating the impinging elements and traffic paths by an advertisement as it is delivered from its originating ad server to the web server from which the webpage including the ad is delivered to a web page displaying an ad for viewing by users. The methods are server-based and provide output to a viewer's browser upon receiving a web page as input and yield data for a particular advertisement frame about the various intermediate processes involved with delivering the advertisement on a web page, for example, frames, pixels, advertisement servers, advertisement networks, advertisement tags, advertisement exchanges, cookies, supply-side distribution systems, demand-side-buying systems, etc.

In some implementations, a method using one or more computing devices, for discovering impinging elements and traffic paths of an advertisement on a web page may comprise 1) loading a select web page from a server hosting the web page to an analytics server; 2) determining elements on the web page that are advertisements; 3) executing the code required to serve each of the advertisements to emulate a browser executing the code; 4) in every instance that a new element of script is invoked, identifying the elements returned from the web page by that script and storing the elements; 5) collecting intermediate results until the advertisement is delivered to the web page; and 6) matching the coded information to known information stored to identify at least one of entities and processes that correspond to the intermediate results.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

In an online advertising environment, there is typically great demand to discover and understand information about advertising network flow by which an advertisement or "ad" is moved from its origination point (e.g., an ad server, a private database, another application that collects and stores advertisements in a database, a client device, or the like) to its destination point (e.g., a publisher's web page). The present technology is directed to a system and methods that yield information about the choices and decisions that are dynamically made by those entities or elements that impinge on an "ad" flow towards its destination. This information may relate to consumer privacy, publishing systems, ad networks, ad-optimization systems, ad exchanges, ad-verification and accountability systems, measurement systems, tracking systems, and other participants involved in the flow, "trafficking", or display of a particular "ad." In most instances, even buyers and sellers of an "ad" are often unable to determine these factors, much less with ease, and it is much more complex and difficult for those who want to gather or discover this information when they are neither the buyer nor the seller.

In some implementations, the systems and methods of the present technology are configured to discover or estimate the advertising network data flow by which a creative or advertisement ("ad") travels from the ad server where it originates or from where it is served to the web server from which a particular webpage including the creative ("ad") is delivered to an end user or client. The systems and methods of the present technology relate to discovering, locating, deriving, extracting, or otherwise finding, information that is useful for determining an estimate of the advertising network data flow.

Figure 1:
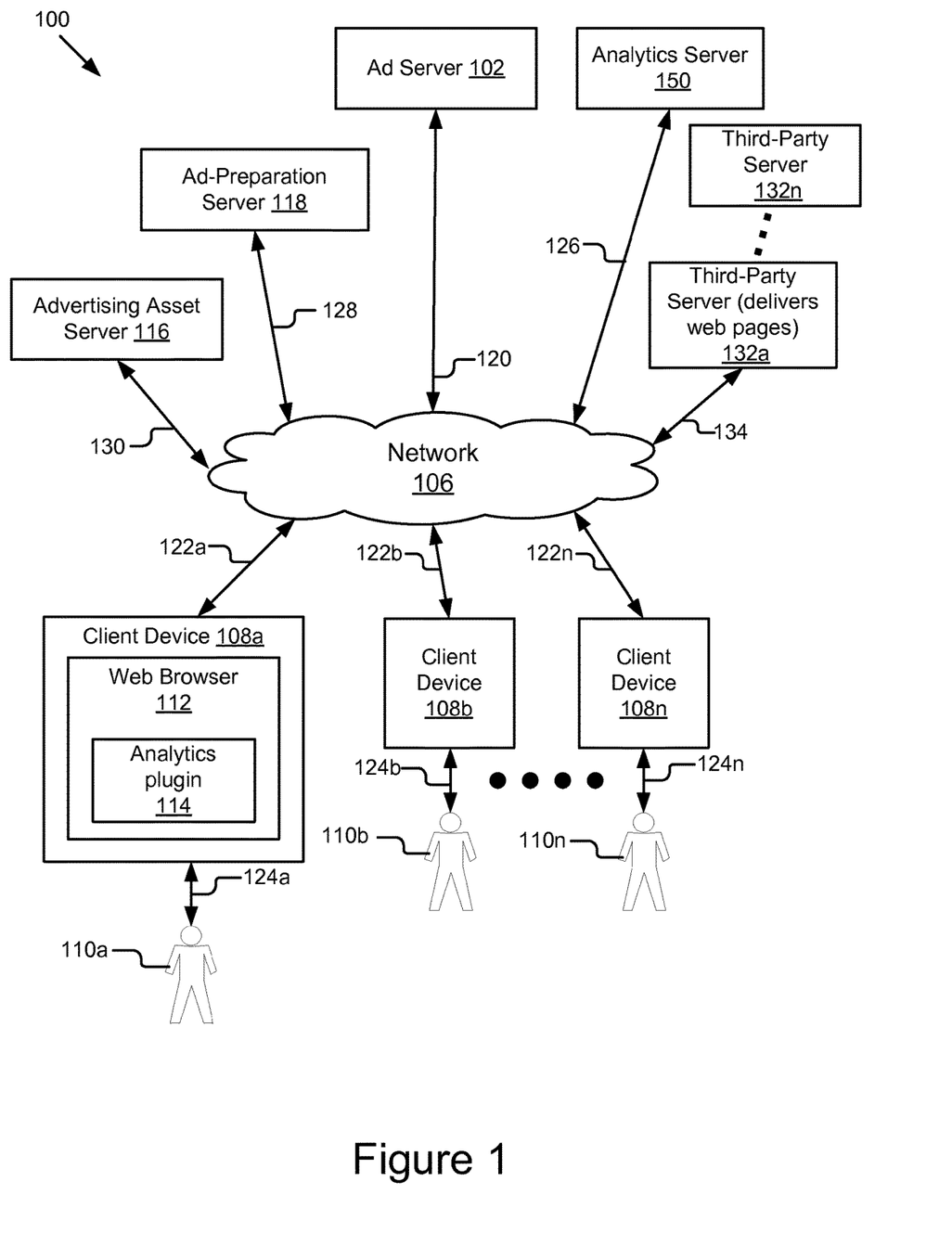
FIG. 1 is a block diagram of system architecture including an analytics server configured to gauge or estimate the network data flow by which a creative or advertisement ("ad") travels from the ad server where it originates to the web server from which the webpage including the creative ("ad") is delivered to an end user or client.

Referring to FIG. 1, system architecture for an advertising environment is generally illustrated by reference numeral 100. The system architecture includes an analytics server 150 configured to provide analytics, for example, configured to allow a particular web page to be diagnosed for the elements involved in "trafficking" the "ad" by any entity with access to the present technology, even if the entity, which may be a company or person is not a participant in the ad transaction itself. For the web page to be easily diagnosed, the system 100 is configured to provide access or obtain the web page that is to be diagnosed.

In the following description, for purposes of explanation, numerous specific details are indicated in order to provide a thorough understanding of the technology described. It should be apparent, however, to one skilled in the art, that this technology may be practiced without these specific details. In other instances, structures and devices are shown in block diagram form in order to avoid obscuring the technology. For example, the present technology is described with some embodiments below, with reference to user interfaces and particular hardware. However, the present technology applies to any type of computing device that can receive data and commands, and any devices providing services.

Reference in the specification to "one embodiment or implementation," "an embodiment or implementation," or "some embodiments or implementation" simply means that one or more particular features, structures, or characteristics described in connection with the one or more embodiments or implementations is included in at least one or more embodiments or implementations that are described. The appearances of the phrase "in one embodiment or implementation" in various places in the specification are not necessarily all referring to the same embodiment or implementation.

Some portions of the detailed descriptions that follow are presented in terms of method algorithms and symbolic representations of operations on data bits within a computer memory of either one or more computing devices typically used in. These algorithmic descriptions and representations are the means used by those skilled in the data processing and arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms such as "processing," "computing," "calculating," "determining," "transmitting," or "displaying" or the like, refer to the actions and processes of a computer device or system or similar electronic computing device that manipulates and transforms data represented as physical (electronic) quantities within the computer device or system's registers and memories into other data similarly represented as physical quantities within the computer system memories or registers or other such information storage, transmission, or display devices.

The present technology also relates to system architecture for performing the operations described here. This system architecture may be specially constructed for the required purposes or methods stated here, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology may take the form of an entirely hardware embodiment, an entirely software embodiment, or an embodiment including both hardware and software components. In some embodiments, this technology is implemented in software, which includes but is not limited to firmware, resident software, microcode, etc.

Furthermore, at least portions of this technology may take the form of one or more computer program products accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device. The components used in systems and networks may use a data processing system suitable for storing and/or executing program code including at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) may be coupled to the system architecture either directly or through intervening I/O controllers.

Communication units including network adapters may also be coupled to the systems to enable them to couple to other data processing systems or storage devices, through either intervening private or public networks. Modems, cable modems, and Ethernet cards are just a few examples of the currently available types of network adapters.

Finally, the algorithms and operations presented in this application are not inherently related to any particular computer or other apparatus. Various general-purpose systems may be used or modified with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

The present technology is now described more fully with reference to the accompanying figures, in which several embodiments of the technology are shown. The present technology may be embodied in many different forms and should not be construed as limited to the embodiments set forth herein. Rather, these embodiments are provided so that this disclosure will be thorough and complete and will fully convey the invention to those skilled in the art.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

System Architecture Overview

FIG. 1 illustrates a block diagram of one embodiment of the advertising system 100 of the present invention. The advertising system 100 is configured to advantageously either collect, obtain, or otherwise receive information, generate, and present advertising analytics for online advertisements to interested parties, whether buyers, sellers, or others interested in discovering or acquiring information. The advertising system 100 also retrieves and presents on-line advertisements in a manner similar to how they may be presented online. For the examples described in the specification below, an online advertisement ("ad") may be text, picture, or video, the purpose of which may be to advertise or otherwise communicate, for example, by including any flash asset, any image from the Internet Advertising Board ("IAB") or industry standard width and height that may be clicked on including any recursion into iframes from the original page. The illustrated ad system architecture 100 includes an advertising-asset server 116, an ad-preparation server 118, an ad server 102, a network 106, one or more third party servers 132, and one or more client devices 108a-108n that may be accessed by one or more users, 110a-110n. In the illustrated embodiment, these entities are communicatively coupled via a network 106. Although only three client devices 108a-n are illustrated, it should be recognized that any number of client devices 108n may be available to any number of users 110n. Furthermore, while only one network 106 is illustrated as coupled to the advertising-asset server 116, the ad-preparation server 118, the ad server 102, the analytics server 150, the third-party server 132 (a-n), and the one or more client devices 108a-108n, in practice, any number of networks 106 may be connected to these entities. In one implementation, the advertising-asset server 116, the ad-preparation server 118, the ad server 102, the analytics server 150, and the third-party server 132 (a-n) are hardware servers including a processor, memory, and network communication capabilities. Although only two third-party servers 132 (132a and 132n) are shown, the system 100 may include one or more third-party servers 132.

The network 106 may be a conventional type, wired or wireless, and may have any number of configurations such as a star configuration, token ring configuration, or other configurations. Furthermore, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

The client device 108a is representative of client devices 108a-108n and may be a conventional type of computing device, for example, a personal computer, a hardware server, a laptop computer, a tablet computer or smart phone, or the like. The client devices 108a-108n may be coupled to the network 106 by signal lines 122a-122n, respectively. In one embodiment, the client device 108 (a-n) may be coupled to receive advertisements online from the ad server 102 and other content from publishing sites or third-party servers (a-n). The client device 108 (a, b, or n) includes a web browser 112 for presenting online content and advertisements to the user (110a-110n). The web browser 112 presents ads and other content, and receives input from the user 110 (a-n) as represented by signal lines 124 (a, b, or n). The web browser 112 and analytics plug-in are operable on the client device 108 (a, b, and n). The analytics plugin 114 is configured to provide information about the choices, decisions, or actions by elements impinging on an ad's flow towards its destination. In some implementations, this information may relate to consumer privacy, publishing systems, ad networks, ad-optimization systems, ad exchanges, ad verification and accountability systems, measurement systems, tracking systems, and other elements or participants involved in the flow or "trafficking" or ultimate display of an advertisement (ad). Even the buyers and sellers of the advertisements may use the technology of the analytics server 150 to determine these factors. Moreover, other entities that are neither the buyer nor the seller may use this technology to determine the analytics, as it is much more complex for these entities to discover any information. The analytics server 150 is configured to allow any web page to be diagnosed or analyzed for the elements involved in "trafficking," the ad, by the buyer, the seller, or any company or person that may not be a participant in the ad transaction itself.

The advertising-asset server 116 may be a computer program operating on a hardware system for storing and providing advertisements or assets to other systems that may ultimately deliver or serve the ads to the end user or client. The advertising-asset server 116 may be coupled to the network 106 as illustrated by a signal line 130 and configured to receive advertisements or assets from advertisers. In one embodiment, the advertising-asset server 116 is configured to store the advertisement or asset that may ultimately be delivered to the client devices 108 for viewing. For example, the asset may include an ad copy, ad content, JavaScript or flash, which when executed by the client device 108 (a-n) in the web browser 112 presents the advertisement to the user 110 (a-n) as designed by and intended by the advertiser. The advertisers may interact with the advertising-asset server 116 to upload and store advertisements on the advertising-asset server 116. These advertisements may then be available for delivery to the ad-preparation server 118 or the ad server 102, which in turn processes the advertisements and delivers them to the client device 108 (a-n).

The ad-preparation server 118 may be a computer program operating on a hardware system for preparing advertisements for ultimate delivery to the client devices 108 (a-n). In one embodiment, the ad-preparation server 118 retrieves advertisements from the advertising-asset server 116 and modifies them (e.g., by adding a script). The modified ads are then delivered by the ad-preparation server 118 to the ad server 102 for combination with content and delivery to the client device 108 (a-n). The ad-preparation server 118 is coupled to the network 106 as illustrated by signal line 128 for communication with the advertising asset server 116 and the ad server 102.

The ad server 102 may be a computer program operating on a hardware system for placing advertisements on websites. For example, the ad server 102 may be a web server that receives advertisements from the ad-preparation server 118 or the advertising-asset server 116 and delivers them to website visitors. The ad server 102 may be coupled to the network 106 as illustrated by signal line 120 for receiving ads from the ad-preparation server 118 or the advertising-asset server 116 and for delivering the ads to third-party servers 132, sites, or domains (not shown).

The analytics server 150 may be a computer program operating on a hardware system for discovering and collecting or otherwise receiving and presenting information and analytics relating to advertising flow. In some instances, the analytics server 150 may be configured to receive data from various sources, for example, the analytics plugin 114 operating on the client device 108. The analytics server 150 may also receive information (e.g., information relating to the presentation of ads including intermediate processes that leading to ad presentation) from the ad server 102, from the ad-preparation server 118, the advertising-asset server 116, or from third-party servers 132 (a-n). The analytics server 150 may process the information and generate analytics for either buyers, sellers, or any others. The operations of the analytics server 150 are described in greater detail below. The analytics server 150 may be coupled by signal line 126 to the network 106 for communication with the client devices 108a-108n and the ad server 102.

Client Device 108a

Figure 2A:
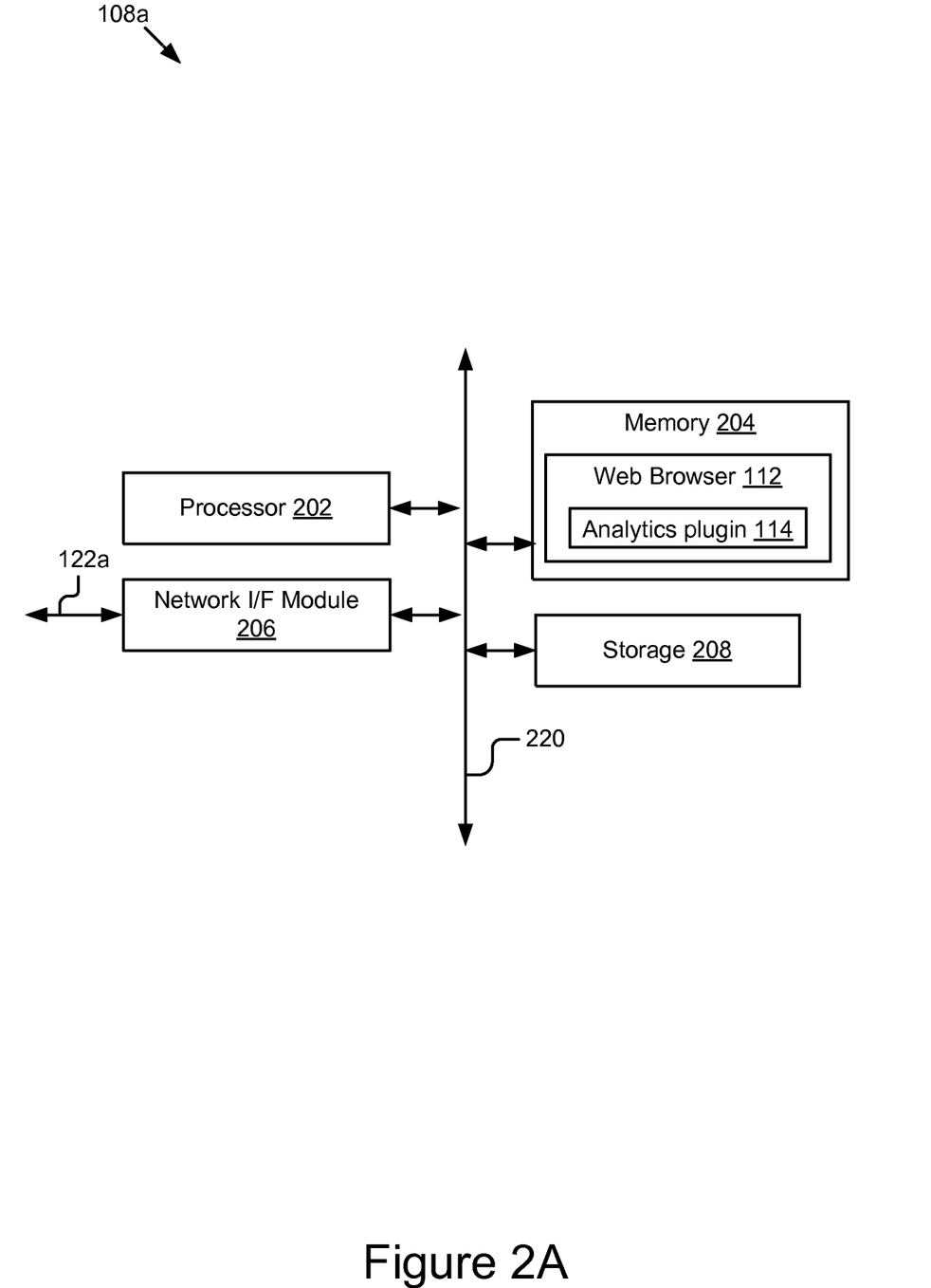
FIG. 2A is a block diagram illustrating example hardware components in some implementations of a client device including an analytics plug-in illustrated in the system architecture of FIG. 1.

FIG. 2A is a block diagram of one embodiment of the client device 108a. In this embodiment, the client device 108a comprises: a processor 202, a memory 204, a network interface (I/F) module 206, storage 208, and a bus 220.

The processor 202 comprises an arithmetic logic unit, a microprocessor, a general-purpose controller or some other processor array to perform computations and provide electronic display signals to a display device. The processor 202 is coupled to the bus 220 for communication with the other components. The processor 202 processes data signals and may comprise various computing architectures including a complex instruction set computer (CISC) architecture, a reduced instruction set computer (RISC) architecture, or an architecture implementing a combination of instruction sets. Although only a single processor 202 is shown in FIG. 2A, multiple processors may be included. Other processors, operating systems, sensors, displays and physical configurations are possible.

The memory 204 stores instructions and/or data that may be executed by processor 202. The memory 204 is coupled to the bus 220 for communication with the other components. The instructions and/or data may comprise code for performing any and/or all of the techniques described herein. The memory 204 may be a dynamic random access memory (DRAM) device, a static random access memory (SRAM) device, flash memory or some other memory device. In some embodiments, the memory 204 stores a web browser 112 which includes an analytics plugin 114.

The network interface (I/F) module 206 may be coupled to the network 106 as illustrated by signal line 128 and coupled to the bus 220. The network interface module 206 includes ports for wired connectivity such as but not limited to USB, SD, or CAT-5, etc. The network interface module 206 may link the processor 202 to the network 106 that may in turn be coupled to other processing systems. The network interface module 206 may provide other connections to the network 106 using standard network protocols such as TCP/IP, HTTP, HTTPS and SMTP. In other embodiments, the network interface module 206 may include a transceiver for sending and receiving signals using Wi-Fi, Bluetooth® or cellular communications for wireless communication. The network interface (I/F) module 206 provides a communication path for the components of the client device 108a to the network 106 and other systems.

In one embodiment, the storage 208 stores data, information and instructions used by the client device 108a. Such stored information includes information about users, publishers, ads, assets, and other information. The storage 208 may be a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis. The data storage 208 is coupled by the bus 220 for communication with other components of the client device 108a.

Figure 2B:
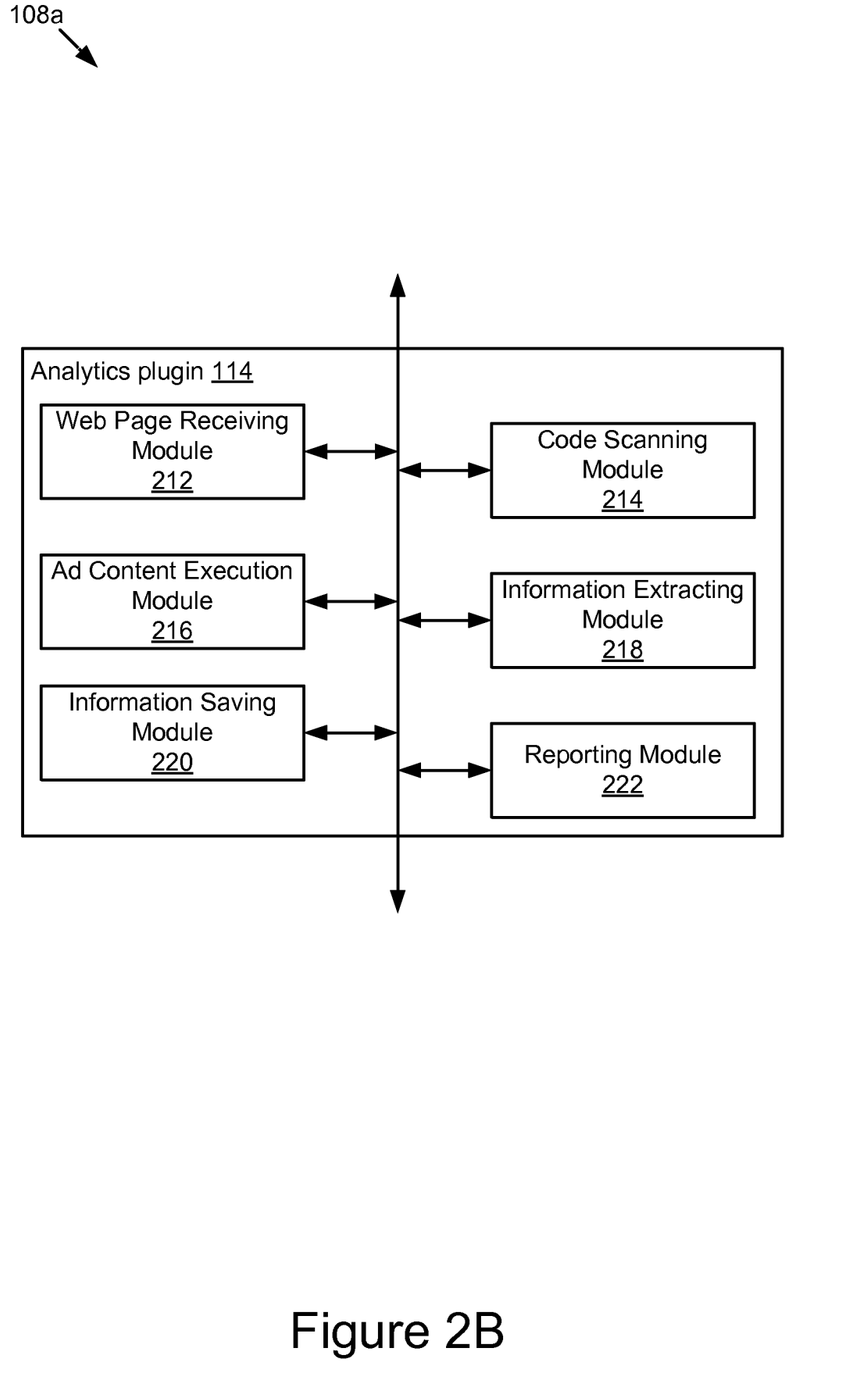
FIG. 2B is a block diagram illustrating an example analytics plugin illustrated in FIG. 1 and its software components.

FIG. 2B illustrates an example analytics plugin 114. The analytics plugin 114 in some implementations may include a web-page-receiving module 212 configured to receive any web page that is to be diagnosed or analyzed to discover information relating to ads that may appear on that web page. The analytics plugin 114 further includes code-scanning module 214 configured to scan the code underlying the web page and an ad-content-execution module 216 configured to execute ad content. An information-extracting module 218 of the analytics plugin 114 is configured to extract or collect information, which is stored by the information saving module 220 and reported by the reporting module 222.

Process Overview

Figure 3:
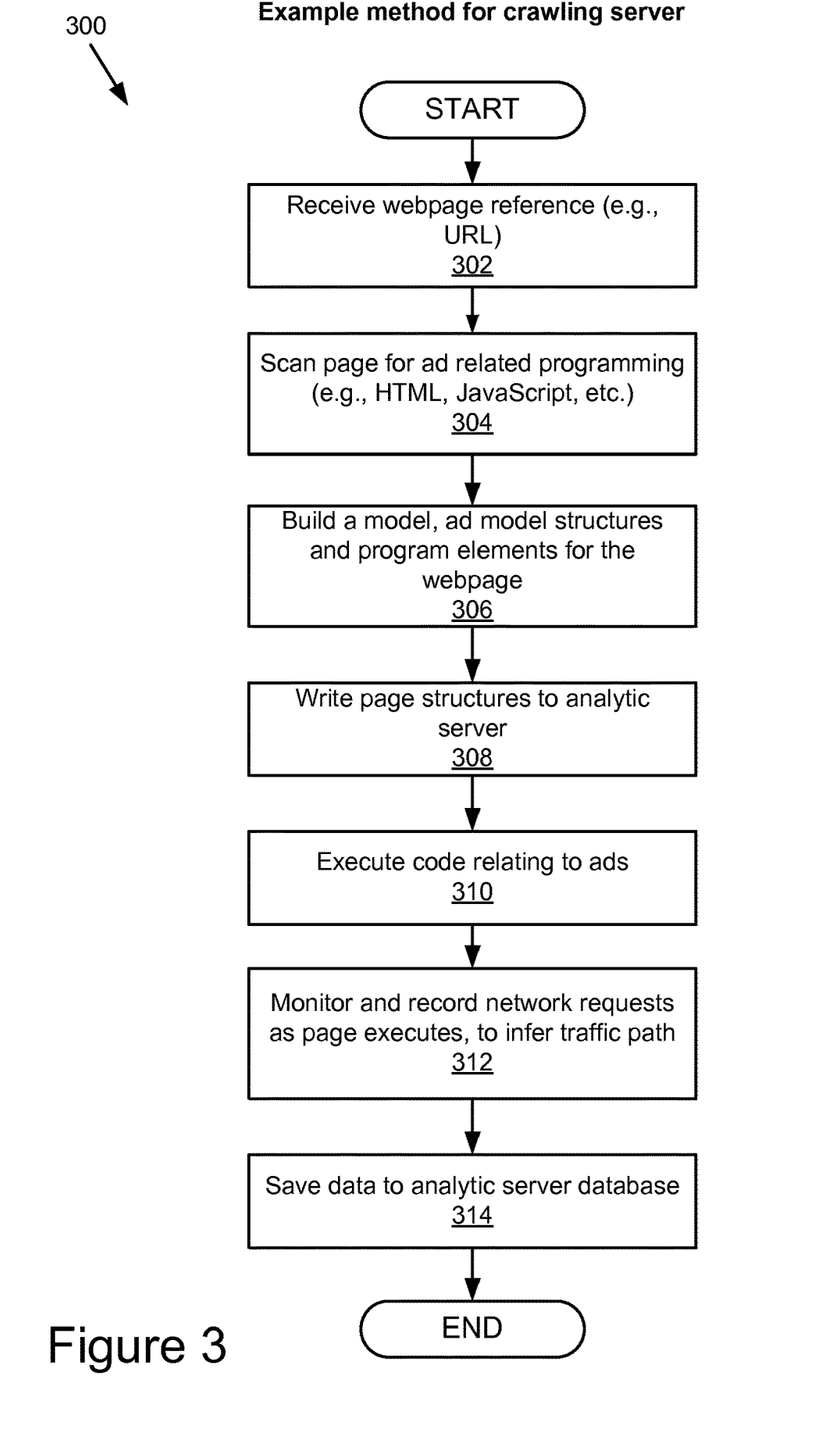
FIG. 3 is a flow diagram of an example process performed by a crawling server.

FIG. 3 illustrates an example method of operations performed by a crawling server or web crawler configured to discover information relating to advertising data flow. FIG. 3 essentially illustrates a server-based process, which writes or feeds its output to a client browser 112. The input may be any web page for which an interested entity desires information on impinging elements and traffic paths relating to one or more advertisements.

To accomplish gathering information or analytics, the process (see FIG. 3) emulates the function of a browser 112 within an analytic server 150 with respect to the page being analyzed. It should be understood that the order of the operations illustrated in FIG. 3 is merely by way of example and that the order may be performed differently than that illustrated and some operations may be excluded and different combinations of the operations may be performed. The example method illustrated generally by reference numeral 300 begins and proceeds to a block 302 representing one or more operations for receiving a webpage reference (e.g., a URL). As one example, the method 300 may load the webpage from its server (e.g., 132) to the analytic server 150.

The method 300 proceeds to the next block 304 representing one or more operations for scanning a page for ad-related programming (e.g., HTML, JavaScript, etc.). As one example, at this point, the method 300 determines by parsing the html code on the webpage the elements on the webpage that are advertisements. The method 300 proceeds to the next block 306, representing one or more operations configured for building a model, ad-model structures, and program elements for the webpage. The method 300 proceeds to the next block 308, representing one or more operations for writing page structures to the analytic server 308. The method 300 proceeds to the next block 310 representing one or more operations for executing code relating to ads. The method 300 proceeds to the next block 312, representing one or more operations for monitoring and recording network requests as web pages execute, to infer traffic paths. The method 300 proceeds to the next block 314 representing one or more operations for saving data on to an analytic server database (for example, the analytic server 150 in FIG. 1).

As an example, for each advertisement, the method executes the code required to serve an ad in emulation as if a browser is executing the html. Each time a new element of Script is invoked, the method finds the elements returned from the web page by that script, and stores them. From there, the method then executes the next phase of scripting, continuing to collect intermediate results until an actual ad arrives into the web page. From there, the method then takes the coded information and matches it to known information, stored in tables. For example, the coded information may relate to which companies or processes, or data, correspond to particular intermediate data. As one example, it may be that a company called "Right Media" placed a java script "JS" from a server named "yield manager" on a particular web page. The tables store the information, which maps "Yield Manager" to "Right Media." The method repeats the same process, from the inner-most frames, moving towards the outer-most frames. This makes certain that all data has been collected, regardless of the conditions under which the ad was discovered, or regardless of how its ultimate rendering may be influenced by unknown factors on the web page.

The process yields data for a particular ad frame about all intermediate processes used to deliver the ad such as frames, pixels, ad servers, ad networks, ad tags, ad exchanges, cookies, supply side distribution systems, demand side buying systems, etc.

Figure 4:
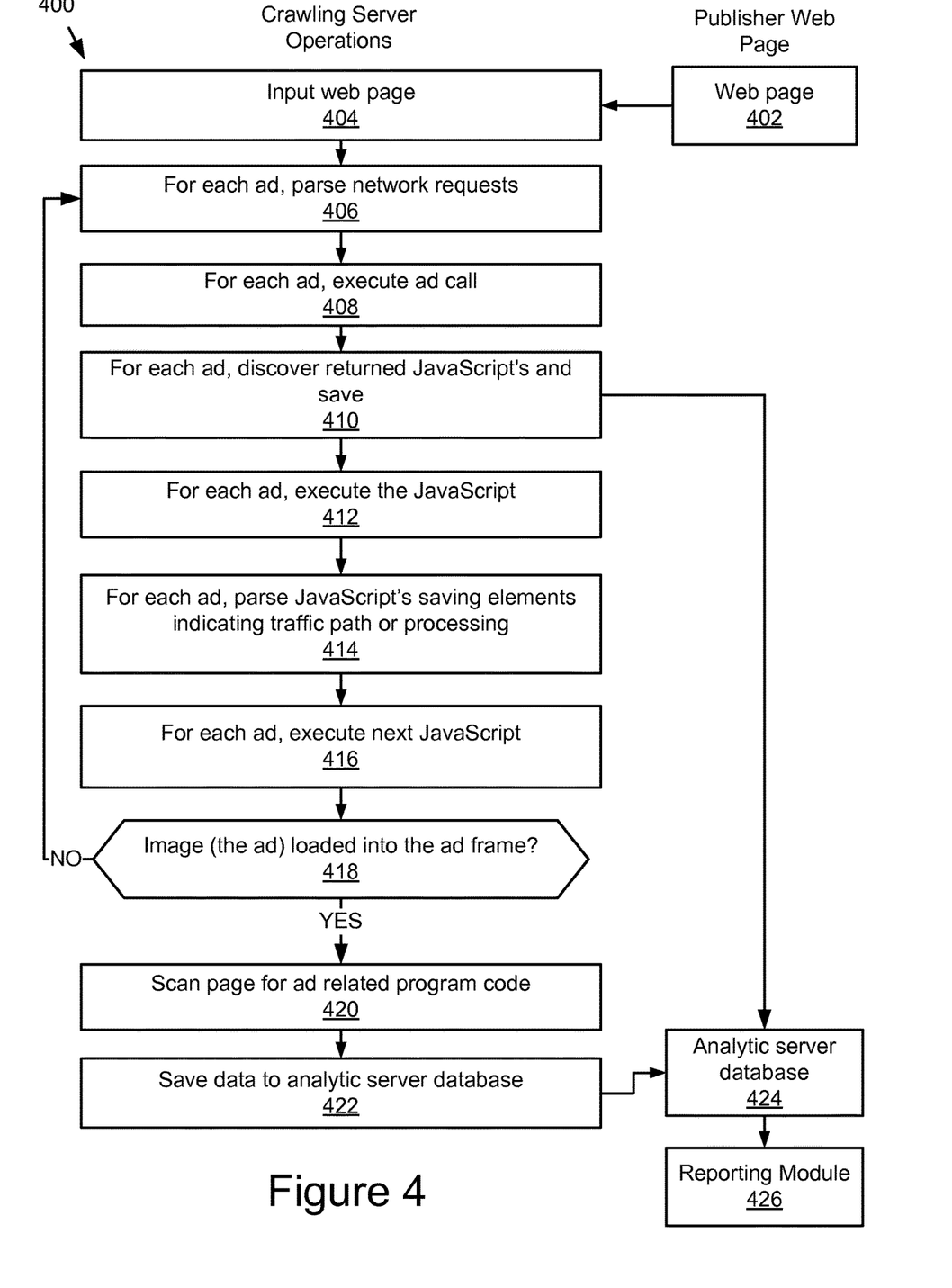
FIG. 4 is an example flow chart of the operations performed by the crawling server.

Referring now to FIG. 4, example operations of the crawling server are illustrated by reference numeral 400. It should be understood that the order of the operations illustrated in FIG. 4 is merely by way of example and that the order may be performed differently than that illustrated and some operations may be excluded and different combinations of the operations may be performed. The method 400 begins and proceeds to block 404 including one or more operations for inputting a web page 402, for example a publisher web page. The method 400 proceeds to the next block 406 representing one or more operations for parsing network requests for each ad. The method 400 proceeds to the next block 408 including one or more operations for executing an ad call for each ad. The method 400 proceeds to the next block 410 including one or more operations for discovering returned JavaScripts for each ad and saving them (in the analytic server database 424). From there, the method 400 proceeds to the next block 412 including one or more operations for executing the JavaScript for each ad. The method 400 proceeds to the next block 414, including one or more operations for parsing JavaScript's saving elements indicating traffic paths or processing for each ad. The method 400 proceeds to the next block 416 including one or more operations for executing the next JavaScript for each ad. The method 400 proceeds to the next block 418 including one or more operations for determining if the image of the ad is loaded into the ad frame. If the answer is "yes," the method 400 proceeds to the next block 420. If the answer is "no," the method 400 returns to block 406 and proceeds through block 408, 410, 412, 414, 416, and 418. At block 420, the method 400 scans the web page for ad-related program code. From there, the method 400 proceeds to the next block 422, including one or more operations for saving data to the analytic server database 424. The analytic server database 424 is connected to the reporting module 426, which is configured to report the information and the analytics.

Figure 5:
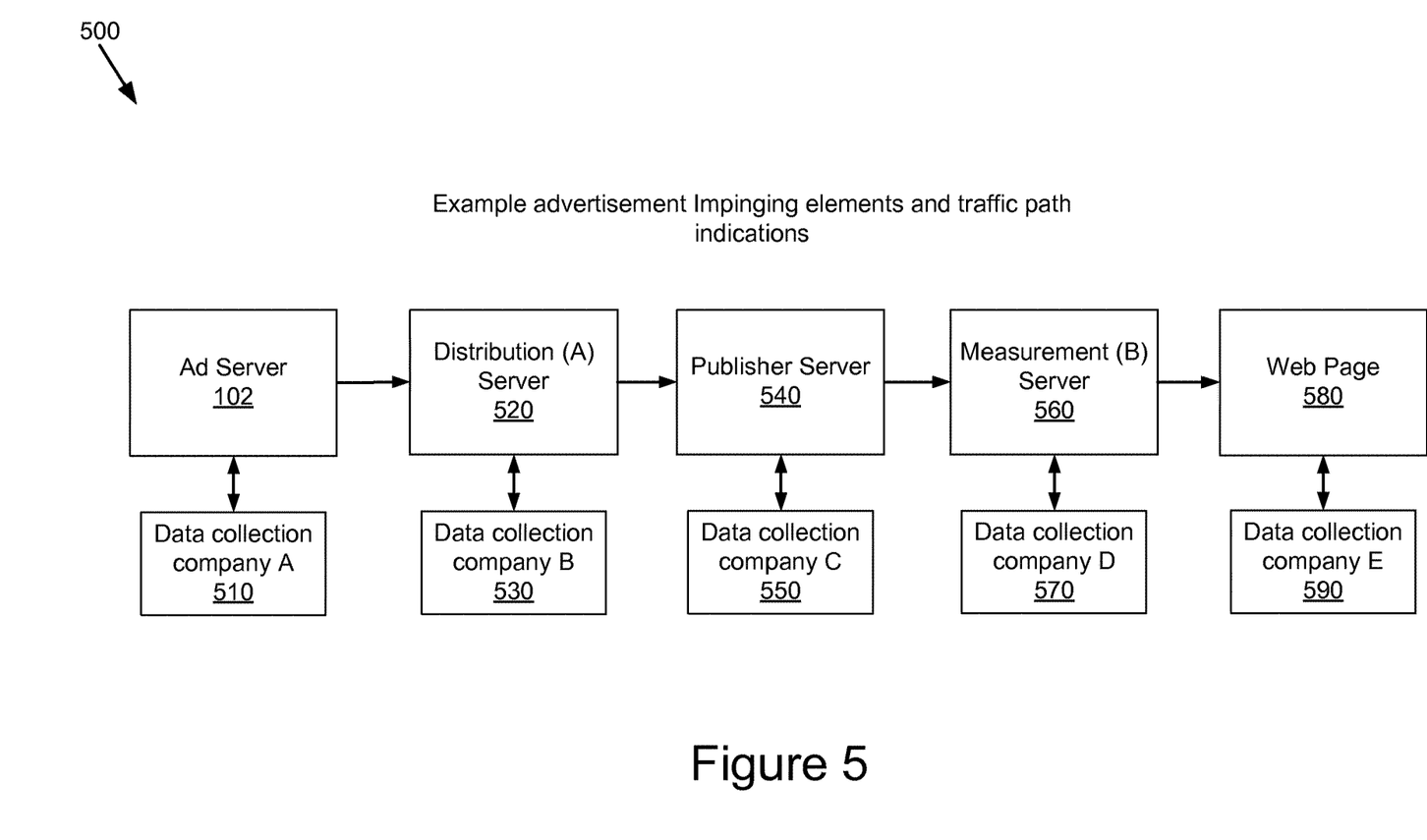
FIG. 5 is a graphic representation of example advertisement impinging elements or entities and traffic path indications.

FIG. 5 illustrates example advertisement impinging elements and traffic path indications or indicator as an advertisement (ad) travels from its source to its destination. FIG. 5 illustrates a scenario of various examples of impinging elements and traffic path indications that may occur, for which the analytics server 150 is configured to collect, gather, or otherwise receive data. In the illustrated example, data may be determined on the ad server 102 (yield management server), which data may be collected from or by company A, indicated by reference numeral 510. A distribution server 520 (e.g., Server A) may have derived data from or by a company B indicated by reference numeral 530. A publisher server 540 may have data derived from or by company C 550. A measurement server 560 may have data derived from or by company D 570. A web page 580 may have data derived or collected from or by company E 590. FIG. 5 illustrates a traffic path from the ad server 102 to the distribution server 520, from the distribution server 520 to the publisher server 540, from the publisher server 540 to the measurement server 560, finally to the ad being rendered on the web page 590. The present technology tracks the elements impinging on an advertisement or discovering how an ad ultimately arrives on a web page involves invoking and storing intermediate results from nested JavaScript's configured to execute the operations that accomplish these functions. The present technology also addresses finding elements within HTML and JavaScripts that are significant in the ultimate path that a particular advertisement took from its source to its destination.

Figure 6:
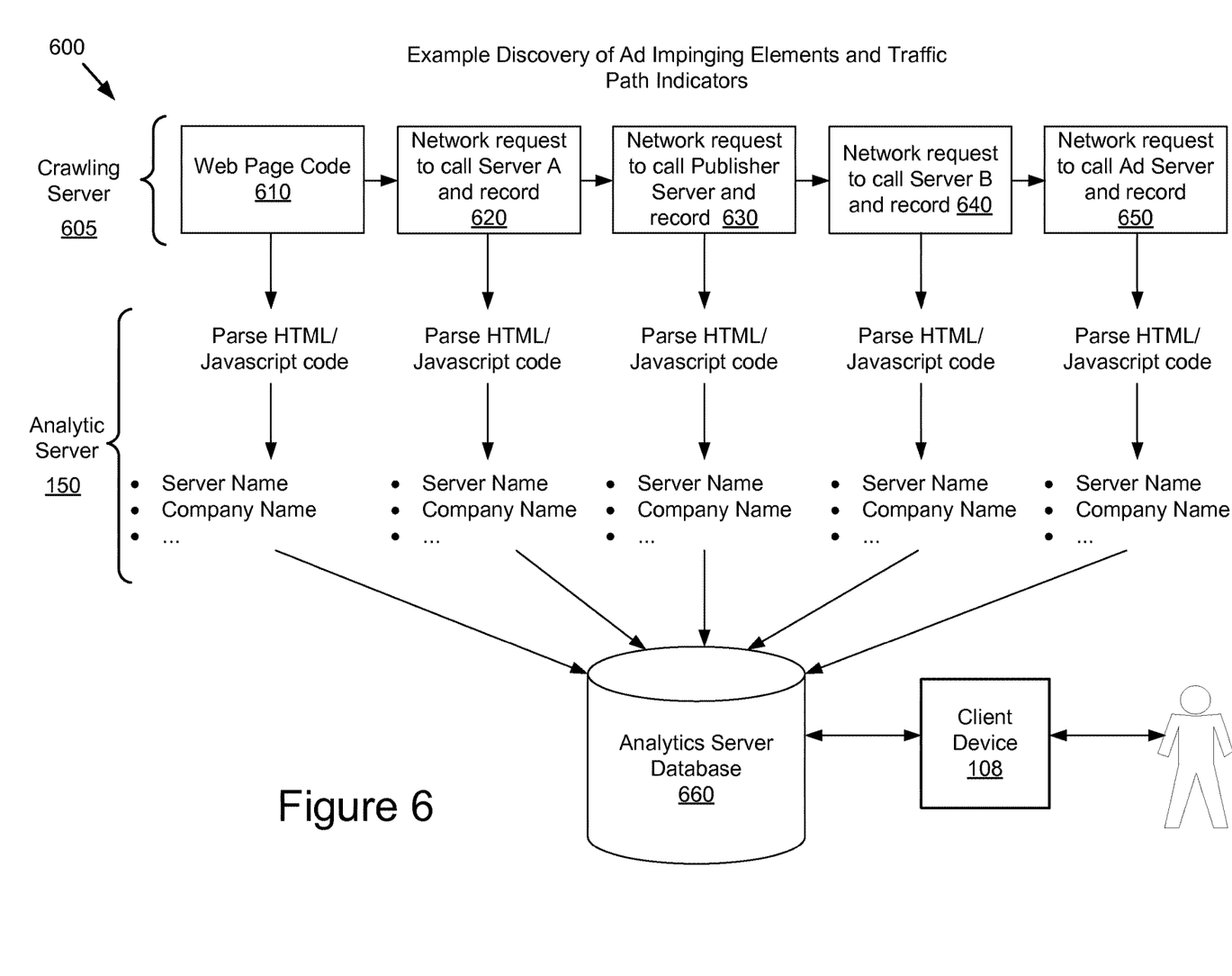
FIG. 6 is a graphic representation of example discovery of advertisement impinging elements or entities and traffic path indications.

FIG. 6 illustrates an example scenario indicated generally by reference numeral 600, illustrating example discovery of elements impinging on advertisement placement and traffic path indicators as a particular advertisement is selected and placed. A first architectural layer illustrates operations that may be performed by a crawling server 605 (any one, more, or all of example companies A, B, C, D, and E illustrated in FIG. 5). In some implementations, the crawling server 605 may discover the web page code, as indicated by reference numeral 610. The analytics server 150 may receive the web page code, and parse the HTML/Javascript code to determine the server name hosting the web page and company name relating to the web page, which may be stored in an analytics server database 660. The crawling server 605 proceeds to a stage, indicated by reference numeral 620, where a network request is made to call server A (the distribution server) and record data. The data is received and processed, that is, the HTML/Javascript code is parsed and the analytic server 150 determines the server name and company name involved in this process. The process 600 flows to a stage, indicated by reference numeral 630, where a network request is made to call the publisher server and record pertinent data. The data is received and processed, that is, the HTML/Javascript code is parsed and the analytic server 150 determines the server name and company name involved in this process and data resulting from the analysis is stored on the analytics server 660. The process flows to a stage, indicated by reference numeral 640, where a network request is transmitted to the measurement server to record data. The data is received and processed, that is, the HTML/Javascript code is parsed and the analytic server 150 determines the server name and company name involved in this process and data resulting from the analysis is stored on the analytics server 660. From there, the process 600 flows to a stage, where a network request is transmitted to the Ad Server to record data and data resulting from the analysis is stored on the analytics server 660. The data is received and processed, that is, the HTML/Javascript code is parsed and the analytic server 150 determines the server name and company name involved in this process and data resulting from the analysis is stored on the analytics server 660.

It should be recognized that the foregoing description of the various embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the blocks, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the blocks, routines, features, attributes, methodologies and other aspects of the present technology can be implemented as software, hardware, firmware, or any combination of the three. Also, wherever a component, an example of which is illustrated by a block, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A method comprising:
receiving, by a computer, a webpage from an originating advertisement server, the webpage hosted by the originating advertisement server;
determining, by the computer, that one or more portions of the webpage are advertisements, one portion of the one or more portions of the webpage being positioned in a frame of the webpage;
emulating, by the computer, a browser of an end user device by executing code that serves the one or more portions of the webpage that are advertisements and by executing a script embedded into at least one advertisement positioned in the frame of the webpage;
invoking, by the emulated browser, each element of a set of elements of the script embedded into the at least one an advertisement, and for each element of the set of elements invoked by the emulated browser:
identifying, by the computer, one or more objects returned by the element of the script; and
storing, in memory associated with the computer, an intermediate result that includes the one or more objects returned by the element of the script,
generating, by the computer, coded information, the coded information including each intermediate result across the set of elements of the script;
matching, by the computer, the coded information to stored information of entities and processes, the matching providing, for each intermediate result of the coded information, an identification of each of: a device involved in delivering a portion of the at least one advertisement to the browser and a corresponding process involved in delivering the portion of the at least one advertisement to the browser;
and transmitting, by the computer, for each intermediate result of the coded information, the identification each of: the device involved in delivering a portion of the at least one advertisement to the browser and the corresponding process involved in delivering the portion of the at least one advertisement to the browser that corresponds to the matched coded information.

2. The method of claim 1, wherein each element of the set of elements of the script executes a request to a server associated with an entity, the request causing a process to be executed that transmits a portion of the at least one advertisement to the browser.

3. The method of claim 1, wherein the at least one advertisement includes at least one of text, picture, video, and a combination of text, picture, and video.

4. The method of claim 1, wherein the matching providing, for each intermediate result of the coded information, an identification each of an entity that is associated with the device and the corresponding process.

* * * * *